Jan. 14, 1964

B. VER NOOY 3,117,453

APPARATUS AND METHOD FOR MAKING INTERNAL SURVEYS OF PIPELINES

Filed Dec. 19, 1960

Burton Ver Nooy
INVENTOR.

BY Browning, Simms,
Hyer & Eisenrohl

ATTORNEYS

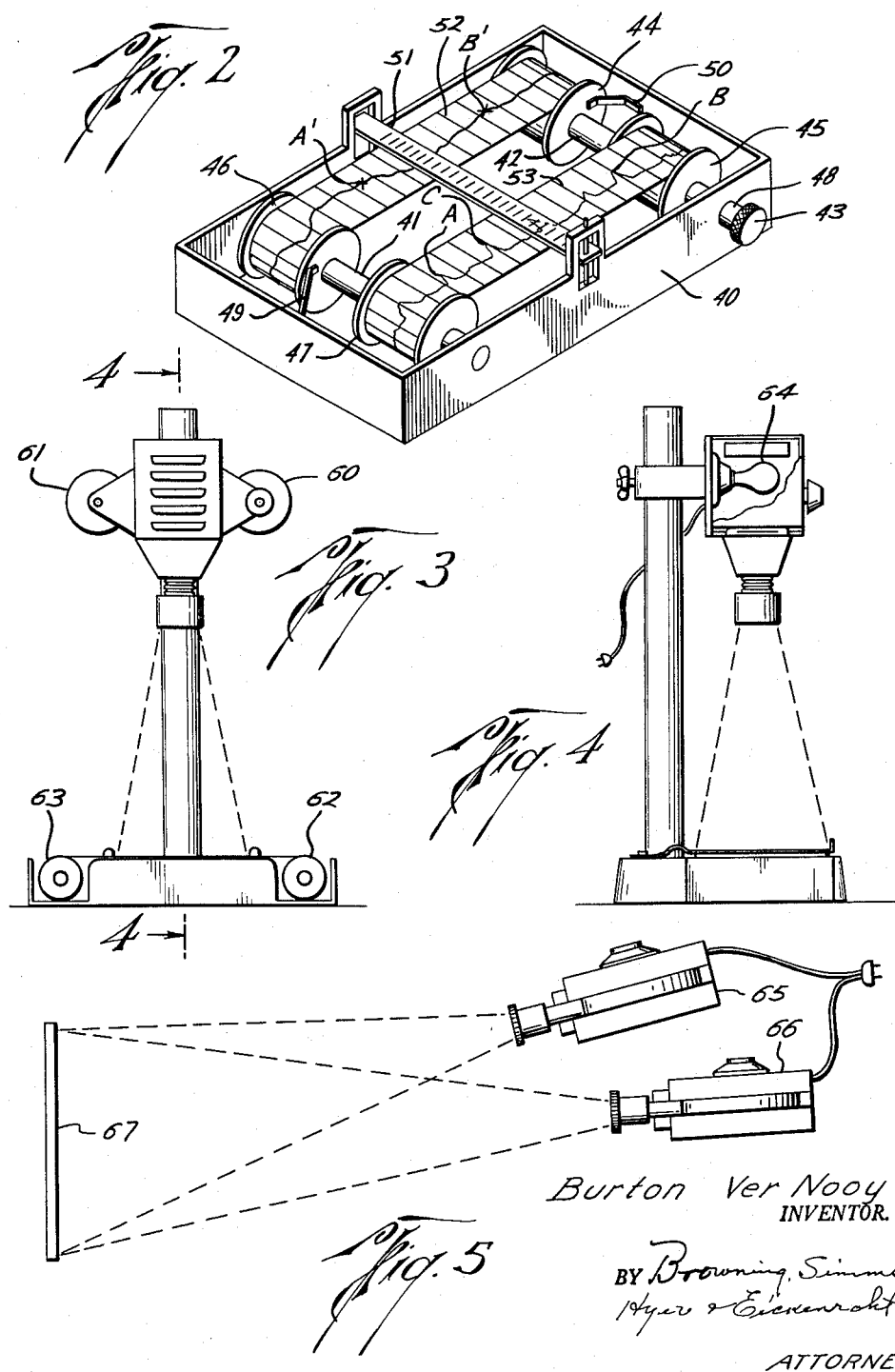

United States Patent Office 3,117,453
Patented Jan. 14, 1964

3,117,453
APPARATUS AND METHOD FOR MAKING
INTERNAL SURVEYS OF PIPELINES
Burton Ver Nooy, Tulsa, Okla., assignor to T. D.
Williamson, Inc., Tulsa, Okla., a corporation
Filed Dec. 19, 1960, Ser. No. 76,698
9 Claims. (Cl. 73—432)

This invention relates to methods and apparatus for making internal surveys of pipelines, such as are commonly used in transporting petroleum products, to determine the condition of the line and/or its contents at any point or throughout its length.

It is known that leaks in a pipeline may be determined to exist by sending certain acoustical- or pressure-responsive instruments through a pipeline and making a continuous record of sound or pressure as the recording instrument passes through the line. Instruments of this general type are well known and are usually mounted in a pipeline scraper or "pig" of conventional type for internal surveying of pipelines. The pig consists essentially of an elongated body member usually tubular in shape and carrying a plurality of sealing cups extending radially outward from the body to make the sealing contact with the wall of the pipeline. The pig is impelled through the pipeline by flow of fluid therethrough.

It has been customary to mount instruments in the body of such pigs and send them through the pipeline to determine the existence of leaks along the line. U.S. Patents Nos. 2,782,370, 2,884,624 and 2,951,362 illustrate devices of this type. A general discussion of internal pipeline surveying also is given by the Oil and Gas Journal, volume 57, Number 22, dated May 25, 1959, pages 123–127.

A principal difficulty that has been encountered with the devices and processes used in the past arises from the fact that the position of the pig in the pipeline at the time significant variations in pressure, noise, etc. occur cannot be determined. Clocks have been used to drive a recording chart on an instrument carried by the pig, and the position of the pig at the time of a variation in a measured property, such as pressure, has been calculated assuming that the velocity of the pig in the line is constant. Odometers carried by the pig and having one or more wheels running on the inside surface of the pipeline which drive a record chart through a train of gearing also have been used in attempts to correlate the position of the pig with a change in the property being measured and recorded on the chart. The gradual reduction in pressure from the point at which pumping pressure is applied to the point at which the pig is removed from the line also has been used in an attempt to correlate the position of the pig with variations in a recorded property.

None of these methods are accurate. The velocity of movement of the pig through the line is variable because it encounters spots or sections of the line which impede its movement. Corroded sections having numerous corrosion pits, rough spots at welds, flat spots, dents or out-of-round sections of the pipe, as well as sharp turns and valves, greatly increase friction upon the sealing cups and also frequently prevent them from sealing properly with the pipeline wall. Thus, there is always some leakage of fluid past the pig during a long trip through the pipeline, and its velocity will be higher in sections of the line where the pipe is round and smooth than in other sections where these conditions do not prevail.

Odometers have been unsatisfactory because a wheel running on the interior of the pipeline does not record distance traveled accurately. The line is not only rough in spots but is usually covered with at least a thin layer of oil or waxy and greasy substance, and the variable pressure exerted on the wheel against rough or out-of-round sections of the pipe causes the measurement of distance by revolution of the wheel to be quite inaccurate. For example, it was found that a pig equipped with three independent odometers, each having a wheel bearing on the inner circumference of a pipeline about 120° apart, when sent through the line between scraper traps located 30 miles apart, registered 18 miles traveled when removed from the downstream scraper trap. Readings obtained on repeated runs did not check but varied anywhere in the range from 18 to 24 miles.

The decrease in pressure in the line also is not uniform; for in addition to fluid heads imposed by variations in elevation of the line as it passes hills and valleys, road crossings, and the like, constricted or out-of-round portions of the pipe and sections having rough interiors also cause frictional variations and add inaccuracies to the assumption that pressure loss is uniform.

The inability of the above methods to locate leaks in a pipeline with reasonable accuracy has led to a suggestion in U.S. Patent No. 2,940,302 for recording variations in pressure on a record trace during passage of a pig through a line and simultaneously recording variations in magnetic flux caused by each collar at pipeline joints on a second trace on the record and location of a leak by reference to the number of collars shown on the trace. This method is accurate, but unfortunately it is applicable only to the smallest sizes of gathering or branch lines since it is not common practice to use collars for connecting joints of pipelines having a diameter above three and one-half to four inches. The joints of the larger transportation lines, in which the problem is acute, are universally welded. Welds do not cause sufficient variation in magnetic flux for this method of location to be applicable to the larger lines.

It is an object of the present invention to provide an apparatus and method for making internal surveys of pipelines having welded joints in which instruments for continuously determining and recording one or more physical properties, such as temperature, differential pressure across the pig in the pipeline, total pressure in the line, pressure in the line between sealing cups of a pig, sound, pressure pulsations, and dielectric constant, mounted in a pig, are impelled through the line by flow of fluid therethrough and the location at which anomalies in the properties are recorded are accurately determined.

Another object is to provide apparatus and a method for accurately correlating points on such records with locations in the pipeline.

Another object is to provide an improved apparatus and process for locating pockets of gas or of liquid in liquid and gas lines, respectively.

Still another object is to provide an improved apparatus and method for locating points in a gas line at which freezing of water vapor carried by the gas is likely to occur under winter conditions.

A further object is to provide an improved apparatus and method for locating points characterized by high resistance, such as dents, flat or out-of-round portions, partial obstructions, or corrosion-roughened sections.

Another object is to provide an improved apparatus and process for detecting and determining the approximate location of loose or moving obstructions, such as foreign material in the line.

Another object is to provide an improved apparatus and process for locating line surges and changes in flow characteristics.

Still another object is to provide an improved apparatus and process for locating points of liquid pickup in gas lines.

Another object is to provide an improved apparatus and process for determining the extent and location of obstructions severe enough to affect overall flow and pressure in the line.

Another object is to provide an improved apparatus and process for detecting line pulsations, pressure surges and "water hammer."

Another object is to provide an improved apparatus and process for locating points of abnormal pressure in the line causing liquifaction or gasification.

Still another object is to provide an improved apparatus and process for locating leaks in the line.

According to the present invention, one or more instruments for continuously determining and recording characteristic properties are transmitted through a pipeline having welded joints by flow of fluid therethrough and preferably enclosed in the body of a pipeline scraper or pig. The number and type of instruments used will depend upon the extent of the survey desired. The instruments that will be most commonly used are those for determining and recording temperature, differential pressure between fluid in the line behind and ahead of the pig, total pressure in the line, pressure in the line surrounding the body of the pig in a space between sealing cups, sound, pressure pulsations, and dielectric constant. The instruments are of conventional type and may be arranged to record the various physical properties continuously determined on a single record, such as a moving chart, or on separate records as desired. A single clock-driven moving chart is preferred; and it is preferred that the record be graduated in units of time, or that the instrument assembly include a clock equipped with means for making indications of elapsed time on the record which may be in hours or suitable fractions thereof, such as minutes.

In this arrangement the pig is inserted in the pipeline and is propelled through the line by the normal flow of fluid therein to a downstream scraper trap where it is removed. Characteristic properties are continuously determined and recorded as the pig passes through the line. The record is then removed from the pig and is placed in comparative relationship with a standard record, which may be a map of the pipeline in elevation or plan, or an aerial photograph of the terrain through which the line passes. In any case, the standard record will have known points of change in characteristic properties indicated thereon, and it is preferably further graduated in linear distance with graduations corresponding to any desired number of feet or miles. The standard record or the record made during passage of the pig through the line is then moved until points of change in the characteristic physical property on the record from the pig are brought into coincidence with known points of change shown on the standard record. Since in the preferred arrangement, the standard record is also graduated in linear distance and the record from the pig is graduated in units of time, the correlation between these graduations between known points of change coinciding on both records enables rapid and accurate location of a desired point at which an anomalous reading was obtained.

The pig may be equipped with any or all of the instruments described above depending upon what properties are characterized by anomalies corresponding to conditions sought. For example, a recording thermometer will show low temperatures at points at which freezing may occur under winter conditions in a gas line carrying water vapor and lowering of temperature at points where liquid collects in gas lines and, conversely, higher temperatures at points at which gas vaporizes from liquid transported through the line.

A recording differential pressure gauge is able to record the difference in pressure between fluid behind the pig and ahead of the pig and is used when it is desired to locate the points of deviation from smooth, round, straight pipe. Hence, flat spots or other unplanned obstructions as well as corrosion-pitted pipe will increase the pressure differential across the pig and will be shown on the record by a differential pressure peak. Planned changes in the line, such as valves, fittings, changes in pipe diameter, bends, branches and other discontinuities will also show up on this record as peaks or dips in the recorded differential pressure and serve as matching points to be matched against corresponding indications on the standard record. Loose or moving obstructions such as may be caused by foreign material in the line will also show up as peaks on a differential pressure line on the chart and may be identified and approximately located by their differences in location on repeated runs.

Line surges and changes in flow will be shown by changes in the distance on the record between known points such as valves, fittings, etc. Since the standard record in the preferred form is graduated in linear distance and the record from the instruments carried by the pig is graduated in time, line surges and changes in flow are easily detected.

A continuous recording pressure gauge may be included in the pig to record the total pressure of fluid in the line. This record will indicate the location and severity of line obstructions which affect flow and overall pressure. An obstruction of this nature will be apparent on the record as a drop in pressure which does not return to normal value. This record is also valuable in furnishing points for correlation with the standard record in that changes in pressure are easily matched with the location of hills and valleys shown on the standard record.

In the attached drawings,

FIG. 2 illustrates schematically a device for bringing a record trace made by the device of FIG. 1 into correspondence with a standard record having locations of pipeline elements causing changes in magnitudes of characteristic properties indicated thereon.

FIG. 4 shows a projector arranged for projecting an enlarged image of one of the records illustrated in FIG. 2 upon the other and adapted to enlarge one record to bring it to the same scale as the other.

FIG. 3 is a side view of the projector of FIG. 4; and FIG. 5 illustrates a pair of cooperating projectors for projecting both records on a single screen.

Figure 1:
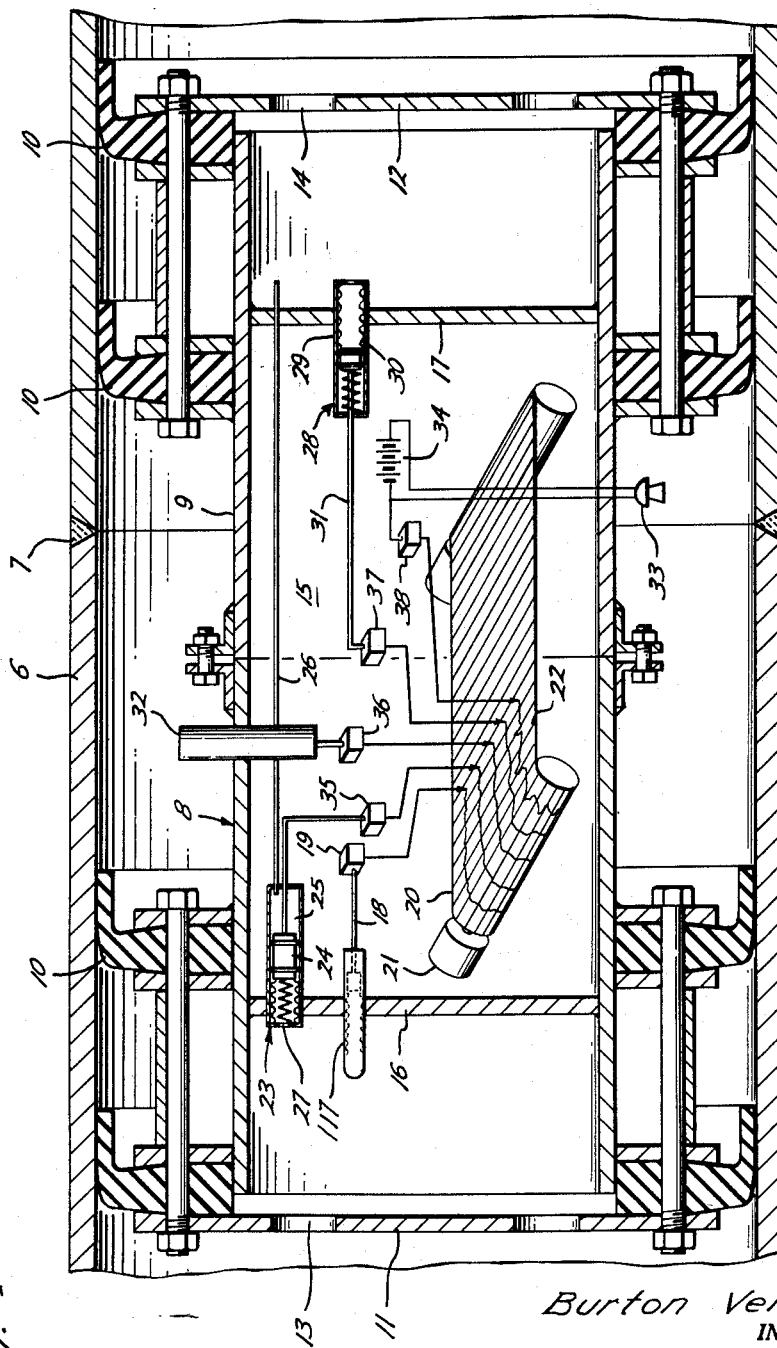
FIG. 1 illustrates diagrammatically a pipeline pig equipped with a plurality of instruments for continuously determining and recording characteristic properties and adapted to be propelled through the pipeline by flow of fluid therethrough.

In FIG. 1 the reference numeral 6 indicates a pipeline having welded joints 7. A pig, designated generally by the reference numeral 8, comprises a body 9 and a plurality of annular sealing cups 10 carried by the body and projecting outward radially into sealing contact with the inner wall of pipeline 6. The pig has front and rear end walls 11 and 12, respectively, having openings 13 and 14 therethrough permitting free communication of fluid in the pipe line outside the pig with front and rear walls 16 and 17, respectively, of a fluid-tight compartment 15 in which recording instruments are installed.

The walls 9, 16 and 17 of compartment 15 have openings suitable to receive any instrument desired for determining and recording characteristic properties. One of the instruments shown schematically is a thermometer 117. Thermometer 117 may be of expanding bellows type in which a fluid expands a bellows to operate an actuating rod 18 disposed to cause a recording device 19 to record the magnitude of the temperature continuously upon a chart 20. The invention, however, is not limited to the use of any particular type of recording instruments; and it is contemplated that any recording instrument commonly available upon the market may be used. It is therefore believed to be unnecessary to describe the instruments in detail.

A record on which record traces are made by each instrument is illustrated as a chart 20 driven at constant speed by a driving means illustrated schematically as a clock 21 and preferably graduated with transverse graduations 22 corresponding to desired units of time. It is to be understood that either a mechanical or an electrically driven clock or other means for driving the chart at constant speed may be used if desired, and that either a single chart or a separate chart for each recording instrument may be used. The chart also may be replaced by a record device having magnetic channels on which the various record traces are made according to methods well known in the art.

The instruments illustrated also include a differential pressure gauge 23 comprising a reciprocating cylinder 24 disposed in a suitable cylinder 25 and spring loaded. Cylinder 25 communicates with the interior of the pipeline behind the pig through a pipe 26 and communicates at its other end with the pipeline ahead of the pig through an opening 27 in the cylinder. A total pressure gauge 28 is illustrated as a cylinder 29 having an opening communicating with the interior of the pipeline behind the pig and containing a spring loaded bellows 30.

A second total pressure gauge 32, which may be similar in construction to gauge 28, is illustrated as disposed to determine total pressure in the line between leading and trailing series of sealing cups 10 in order to determine accurately a pressure drop which may be caused by a leak and which is intensified by being momentarily isolated from fluid under pressure in the pipeline by the series of cups bridging the location of the leak. A conventional microphone 33 also is illustrated as located between the leading and trailing series of cups in order to detect leaks from the noise made by escaping fluid. A suitable battery 34 is connected in the electric circuit to the microphone and it is to be noted that all instruments are attached to suitable recording means 35, 36, 37 and 38 which are disposed to make continuous traces on a record indicating the magnitudes of various properties continuously determined by the various instruments.

Any one or more of the instruments illustrated may be used or other conventional instruments for determining other characteristic properties may be substituted for the instruments shown. The present invention is not limited to any particular number or type of instruments. The instruments shown diagrammatically and described in general terms are conventional, and it is contemplated that any conventional type instrument might be used instead of those illustrated.

When a single record having multiple traces made by a plurality of instruments is used, it is preferred that all instruments be aligned to record simultaneously upon each of the lines 22 graduating the record in units of time so that the magnitude of each of the characteristic properties at a particular location can easily be determined. A transverse line parallel to the graduations on the record will intersect the record traces to show the magnitude of each of the characteristic properties at any selected point.

If desired, the graduations 22 may be omitted from the record, but it is preferred when this is done that the constant speed driving device 21 be equipped with a time operated pen or other device for indicating time intervals on the chart.

While a pen and chart is illustrated in FIG. 1, the invention is not limited to this type of record. A photographic film may be used instead when recording devices 19, 35, 36, 37 and 38 are of the type in which a point of light is directed upon the film to make a continuous trace; or magnetic channels and suitable recording heads may be used.

In operation of the process of the invention, instruments, preferably carried in a pig in the manner illustrated are transmitted through a pipeline by flow of fluid therethrough. During passage of the pig through the pipeline, all instruments continuously determine the magnitude of characteristic properties and record these magnitudes in a continuous trace on a record. When the pig arrives at a downstream scraper trap, it is removed and the record is taken out for further comparison with a standard record.

This comparison may be made in a number of ways. FIG. 2 illustrates a device for making a side-by-side comparison of the record made during passage of an instrument through a pipeline and a standard record. This device comprises a frame 40 containing shafts 41 and 42. Spools 44, 45, 46 and 47 adapted to hold a record of the type used are disposed on shafts 41 and 42 and are freely rotatable on the shafts. Means for rotating spools 44, 45, 46 and 47, illustrated as a knob 43, and sleeve 48 attached to spool 45 (and shown for only one spool, it being understood that the other spools may have similar means for rotation), are provided. Springs 49 and 50 are disposed to maintain pressure on their corresponding pairs of spools to prevent the spools from turning accidentally. A graduating measuring scale 51 preferably is disposed transversely to body 40.

A standard record, which may be a map or chart of the pipeline in elevation or in plan, or an aerial photograph of the terrain through which the pipeline passes, having location of known pipeline elements such as constrictions, sharp turns, valves, exposed portions, road crossings, etc. as well as points of elevation and depression which cause variations in the magnitude of characteristic properties indicated thereon is wound on one pair of cooperating spools illustrated as spools 46 and 44 and a record trace of a record made during passage of the instrument through a pipeline is wound on spools 45 and 47. One or both the records are moved until points of change in magnitude of a characteristic property on the record made during passage through the pipeline are brought into coincidence with corresponding points on the standard record. For example, in the drawing the peak A in a record trace is brought into correspondence with point A' on the standard record where a peak is known to occur or point B on the record may be brought into coincidence with point B' on the standard record. A point of anomalous magnitude of the characteristic property C may lie between points A and B and its location is easily established by comparing the linear graduations on the standard record with the graduations in units of time on the test record. Thus, the exact location of point C is easily calculated. Graduations on the transverse bar 51 indicate the degree of change in magnitude of the property and increase the ease of detecting anomalous values.

The device shown in FIGS. 4 and 5 is especially effective for bringing records into correspondence when the record made during passage of the instruments through the pipeline is a photographic one or a paper chart. Either this record or a corresponding standard record is wound upon spools 60 and 61 while the other is wound on spools 62 and 63. A suitable source of light 64 is disposed to project the image of the record wound on spools 60 and 61 upon the other record thus magnifying one of the records to a scale substantially corresponding to that of the other and facilitating matching of locations of change in magnitude of the characteristic property with known points on the standard record. The operation is believed to be obvious from this short description of the device. One or both the records are moved until points in change of magnitude of a recorded characteristic property are brought into coincidence with known locations on the standard record where these magnitudes are known to change. Anomalous values lying between peaks and valleys corresponding to known locations are accurately located by comparing the graduations on the standard and test records.

The device in FIG. 5 is especially desirable for enlarging both records and projecting images of both the test record and standard record on the single screen where they may be brought in coincidence in the manner described under the device of FIG. 4 above.

In FIG. 5 two projectors 65 and 66 are disposed to project images of a test record, made during passage of the pig through the line, and the standard record onto a single screen 67. Projectors 65 and 66 should be freely movable toward and away from the screen to enable the two images to have different magnification on the screen suitable to bring two points on the test record and indications of known locations on the standard record corresponding to these points into coincidence. Measurement of the distance between a point of anomalous magnitude of a characteristic property occurring on the test record and points corresponding to known locations on the standard record is thus facilitated.

It will be observed that all errors in locating points of anomalous values of characteristic properties in a pipeline are reduced to a minimum by the use of the present process.

Graduation of the test record in units of time and of the standard record in units of distance gives clear indication of the changes in velocity of the pig carrying the instruments at various locations and eliminates the large errors due to assumption that a pig travels throughout the length of a pipeline at substantially constant velocity. Line surges are easily detected by the decrease in number of time units on the test record corresponding to a given number of graduations in units of distance on the standard record. The location and extent of internal conditions offering resistance to passage of the pig through the pipeline such as rough, corrosion pitted pipe, flat spots, dents and out-of-round sections are indicated both by an increase in the number of units of time graduations between linear distances indicated on the standard record and are also easily detected by a change in differential pressure in the line across the pig.

It is within the scope of this invention to employ any desired number of recording instruments arranged to determine and record characteristic conditions in the pipeline ahead or behind the carrier pig or in the line between leading and trailing series of sealing cups. Many arrangements of instrumentations in addition to those illustrated will suggest themselves to those familiar with pipeline problems.

From the foregoing it will be seen that this invention is one well adapted to attain all of the ends and objects hereinabove set forth, together with other advantages which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a process for locating a point in a pipeline where a measurable condition exists, wherein at least one instrument is enclosed in a pipeline pig and continuously determines and records magnitudes of at least one characteristic condition whose magnitude is changed distinguishably by the measurable condition and by elements of the pipeline as the instrument is impelled through a pipeline having welded joints by flow of fluid therethrough, and the pig and instruments contained therein pass through the line at varying speed, that improvement which comprises continuously recording magnitudes of the characteristic condition determined as the pig passes through the line, on a first record driven at constant speed and graduated in units of time; removing said first record; bringing the record into comparative relationship with a standard record comprising a chart of the pipeline graduated in units of length and having known locations of pipeline elements causing change in magnitude of the characteristic condition indicated therein; bringing indications of said locations on the standard record at least one at a time into correspondence with points of change in magnitude indicated on said first record until a point of change in magnitude not corresponding to a location on the standard record is found; determining the relationship between units of time on the first record to units of length on the standard record at the point where the non-corresponding change in magnitude is located; and measuring the distance between the point of non-corresponding magnitude and at least one adjacent point of changed magnitude corresponding to an indication of a known location on the standard record.

2. The process of claim 1 wherein the first record and the standard record are placed in side-by-side relationship and at least one of said records is moved longitudinally to bring points of change in magnitude on the first record into correspondence with locations of known points on the standard record.

3. The process of claim 2 wherein the records are projected on a screen.

4. The process of claim 3 wherein the records are projected on a screen at different magnifications to bring a plurality of points on each record simultaneously into substantial correspondence.

5. The process of claim 1 wherein a plurality of instruments for recording different conditions are enclosed within the pig.

6. The process of claim 5 wherein each instrument records a separate record trace on a single record.

7. The process of claim 6 wherein one of said instruments is a recording thermometer.

8. The process of claim 7 wherein one of said instruments is a recording pressure gauge and the standard record is an elevational chart of the pipeline.

9. The process of claim 6 wherein one of said instruments is a recording differential pressure gauge and the standard record includes a plan of the pipeline.

References Cited in the file of this patent

UNITED STATES PATENTS

| | | |
|---|---|---|
| 2,834,113 | En Dean et al. | May 13, 1958 |
| 2,884,624 | En Dean et al. | Apr. 28, 1959 |
| 2,940,302 | Scherbatskoy | June 14, 1960 |
| 2,951,362 | En Dean et al. | Sept. 6, 1960 |